United States Patent [19]

Komada et al.

[11] Patent Number: 5,500,158
[45] Date of Patent: Mar. 19, 1996

[54] UO2 PELLET AND METHOD FOR PRODUCTION THEREOF

[75] Inventors: Norikazu Komada; Keiji Nishinaka; Kazunori Adachi, all of Omiya; Shuji Fujiwara, Naka, all of Japan

[73] Assignee: Mitsubishi Materials Corporation, Tokyo, Japan

[21] Appl. No.: 358,926

[22] Filed: Dec. 19, 1994

[30] Foreign Application Priority Data

Dec. 21, 1993 [JP] Japan ................................. 5-320769

[51] Int. Cl.$^6$ ................................................. G21G 4/00
[52] U.S. Cl. ........................... 252/637; 252/643; 264/0.5
[58] Field of Search ................................. 252/643, 637; 264/0.5; 501/152

[56] References Cited

U.S. PATENT DOCUMENTS 4,314,952  2/1982  Zawidzki .................. 264/0.5
5,139,709  8/1992  Huang et al. .............. 264/0.5

*Primary Examiner*—Ngoclan Mai
*Attorney, Agent, or Firm*—Armstrong, Westerman Hattori, McLeland & Naughton

[57] ABSTRACT

A process for producing a $UO_2$ pellet comprising the steps of producing $UO_2$ powder in accordance with the ADU (ammonium diuranate) method or the AUC (ammonium uranyl carbonate) method, forming a compact of said $UO_2$ powder, and sintering the compact, wherein $UO_2$ powder having a specific surface area of 5–50 $m^2/g$ is used as a raw material in the compact forming step. At least one of chlorine or a chlorine compound (or bromine or a bromine compound) is added, in one or more of the $UO_2$ powder producing step, compact forming step, or compact sintering step, in an amount such that the chlorine content (or bromine content) in the $UO_2$ pellet amounts to 3–25 ppm chlorine (or 6–50 ppm bromine).

9 Claims, 2 Drawing Sheets

UO2 PELLET AND METHOD FOR PRODUCTION THEREOF

BACKGROUND OF THE INVENTION

The present invention relates to a sintered uranium dioxide pellet having a large crystal grain diameter and to a method for making the $UO_2$ pellet.

The $UO_2$ pellet of this type usually is hermetically sealed in a zircalloy clad tube and used as nuclear fuel.

To date attempts to improve the combustion efficiency of nuclear fuel have been made in order to increase the longevity of nuclear fuel, thereby making possible prolonged consecutive operation of a light-water furnace or a high-speed nuclear reactor. The more efficiently the nuclear fuel is burned, the more the amount of fission product (FP) generated by the nuclear fuel pellet increases. Of the fission product, a gaseous one such as xenon (Xe) is diffused into the crystal grain boundary, instead of being solved into the matrix of the nuclear fuel pellet, to form a bubble. The bubble formation causes swelling of the pellet and increases its volume, which in turn causes stress on the clad tube. This may cause a pellet clad interaction (PCI). Also, FP gas diffused into the crystal grain boundary is finally discharged from the pellet and then increases the internal pressure of the fuel rod, so that thermal conductivity of the gap between the pellet and the clad tube is reduced.

In order to prevent not only the increase of PCI but also the decrease of thermal conductivity of the gap, numerous attempts have been made with a view toward making nuclear fuel pellets with a large diameter grain so that the FP gas can be confined in the pellet. In this way, although the emission of gas per se cannot be prevented, if the pellet is made with a large diameter grain, e.g., the crystal grain diameter thereof is doubled, the distance between the place where the FP gas is generated and the grain boundary is also doubled, with the result that the discharge velocity of the FP gas is decreased.

Heretofore, a number of references such as Japanese Unexamined Patent Publication No. 2-124494 have suggested a process for enlarging the crystal grain diameter of the $UO_2$ sintered pellet. According to the description in the foregoing publication, the process for producing a nuclear fuel pellet for a nuclear reactor is characterized in that the process, after a reduction step of a reconversion process, includes the steps of mixing a portion of uranium dioxide powder, which had not been subjected to a grinding step, with a remaining portion of uranium dioxide portion, which had been subjected to grinding, until a uniformly mixed uranium dioxide powder is obtained, pressure forming the resulting mixture of uranium dioxide powder into a compact, sintering the compact under high temperature, thereby obtaining the nuclear fuel pellet. In this manner, the invention provides a process for producing a nuclear fuel pellet having a large crystal grain.

However, the foregoing process for producing the nuclear fuel pellet having a large crystal grain has a problem in that a sufficiently high quality product is not always obtained.

SUMMARY OF THE INVENTION

The present invention has been achieved to solve the above problem, and it is an object of the present invention to provide a process for producing a sintered $UO_2$ pellet having a large crystal grain with a high reliability.

To attain the above-mentioned object, the $UO_2$ pellet according to the present invention contains chlorine from 3 to 25 ppm, bromine from 6 to 50 ppm, or a combined amount of chlorine and bromine from 3 to 50 ppm, wherein the chlorine and bromine contents satisfy the following formula:

(Chlorine content/x)+(Bromine content/y)=1 (1) wherein x is any number ranging from 3 to 25, and y is any number ranging from 6 to 50.

The process for producing a $UO_2$ pellet according to the present invention is an improved process which comprises the steps of producing $UO_2$ powder based on the ADU (ammonium diuranate) method or the AUC (ammonium uranyl carbonate) method, forming the $UO_2$ powder into a compact thereof, and sintering the resulting compact to obtain a $UO_2$ pellet.

The first characteristic of the present invention is not only in that $UO_2$ powder, having a specific surface area of 5–50 $m^2/g$, is used as a raw material in the compact forming step, but also that the amount of chlorine or chlorine compound added in one or more of the steps of producing the $UO_2$ powder, forming the compact or sintering the compact, must be such that the chlorine content in the $UO_2$ pellet amounts to 3–25 ppm.

In the foregoing first characteristic of the present invention, it is desirable that the amount of added chlorine or chlorine compound is equivalent to 10–50 ppm of chlorine to correspond to a chlorine content in the $UO_2$ pellet of 3–25 ppm.

The second characteristic of the present invention is not only in that $UO_2$ powder having a specific surface area of 5–50 $m^2/g$ is used as a raw material in the compact forming step, but also that the amount of bromine or bromine compound added, in one or more of the steps of producing the $UO_2$ powder, forming the compact, or sintering the compact, must be such that the bromine contents in the $UO_2$ pellet amounts to 6–50 ppm.

In the foregoing second characteristic of the present invention, it is desirable that the amount of added bromine or bromine compound is equivalent to 20–100 ppm of bromine to correspond to a bromine content in the $UO_2$ pellet of 6–50 ppm.

The third characteristic of the present invention is not only in that $UO_2$ powder having a specific surface area of 5–50 $m^2/g$ is used as a raw material in the compact forming step, but also in that the amount of chlorine or chlorine compound and bromine or bromine compound added, in one or more of the steps of producing the $UO_2$ powder, forming the compact, or sintering the compact, must be such that the contents of chlorine and bromine in the $UO_2$ pellet satisfy the following formula:

(Chlorine content/x)+(Bromine content/y)=1 (1) wherein x is any number ranging from 3 to 25, and y is any number ranging from 6 to 50.

In the foregoing third characteristic of the present invention, it is desirable that the amount of added chlorine or chlorine compound and bromine or bromine compound is equivalent to a total of 10–100 ppm of chlorine and bromine, wherein the contents of chlorine and bromine in the $UO_2$ pellet satisfy the foregoing formula (1) and the following formula is also met:

(Added amount of chlorine or chlorine compound/x')+ (Added amount of bromine or bromine compound/y')=1 (2) wherein x' is any number ranging from 10 to 50, and y' is any number ranging from 20 to 100.

The present invention will be further described hereunder.

It is known that the ADU method is a process for producing $UO_2$ powder from $UF_6$, via a slurry of ammonium diuranate {ADU: $(NH_4)_2U_2O_7$}.

It is further known that the AUC method is a process for producing the $UO_2$ powder from $UF_6$, via a slurry of ammonium uranyl carbonate {AUC: $(NH_4)_4UO_2(CO_3)_3$}.

(a) Process for producing a $UO_2$ pellet by the ADU method.

The process for producing the $UO_2$ pellet based on the ADU method, comprising the steps of producing $UO_2$ powder from $UF_6$, will now be described in detail with reference to FIG. 1.

$UF_6$ and pure water are first supplied for a hydrolysis step 1 where they are hydrolyzed to produce an $UO_2F_2$ aqueous solution, which in turn is supplied, together with $NH_4OH$, to a precipitation step 2 where an ADU slurry is formed. The ADU slurry is then filtered in a filtration step 3 to produce an ADU cake. In the filtering step, the ADU slurry is filtered through a filter such as a centrifugal separator, a belt filter and the like, and then the filtrate thereof is discharged from the system.

After being dried in a drying step 4, the ADU cake is supplied to a roasting and reduction step 5. In the roasting and reduction step 5, the ADU is pyrolyzed and reduced, under an atmosphere of hydrogen ($H_2$) and steam ($H_2O$), thereby producing a $UO_2$ powder. Since the resulting $UO_2$ powder, as it is, does not have sufficient formability and sinterability, it is sent to a grinding and granulation step 6, in which $UO_2$ powder, including $UO_2$ powder having a specific surface area of 5–50 $m^2/g$, is made. The $UO_2$ powder having a specific surface area of 5–50 $m^2/g$ is selected from the $UO_2$ powder resulting from the grinding and granulation step 6 and then sent to a forming step 7, in which the selected $UO_2$ powder is compressed, thereby forming a compact thereof. The $UO_2$ compact resulting from the forming step 7 is sintered in a sintering step 8, thereby forming a $UO_2$ pellet.

In one or more of the foregoing $UO_2$ powder producing steps 1–6, compact forming step 7, or compact sintering step 8, chlorine or a chlorine compound is added, so that the chlorine content in the $UO_2$ pellet amounts to 3–25 ppm.

Alternatively, in one or more of the foregoing $UO_2$ powder producing steps 1–6, compact forming step 7, or compact sintering step 8, bromine or a bromine compound is added, so that the bromine content in the $UO_2$ pellet amounts to 6–50 ppm.

Still alternatively, in one or more of the foregoing $UO_2$ powder producing steps 1–6, compact forming step 7, or compact sintering step 8, chlorine or a chlorine compound and bromine or a bromine compound are added, so that the chlorine and bromine contents in the $UO_2$ pellet satisfy the following formula:

(Chlorine content/x)+(Bromine content/y)=1 (1) wherein x is any number ranging from 3 to 25, and y is any number ranging from 6 to 50.

The method of addition will now be illustrated with reference to FIG. 1 as follows:

(1) Adding $UCl_4$ to a raw material $UF_6$.

(2) Adding hydrochloric acid (HCl), $NH_4Cl$, or $UO_2Cl_2$ to the $UO_2F_2$ aqueous solution produced in the hydrolysis step 1.

(3) Adding $NH_4Cl$ to $NH_4OH$ which is provided for ADU precipitation.

(4) Adding $NH_4Cl$ to the ADU slurry.

(5) Adding chlorine gas ($Cl_2$), hydrogen chloride gas (HCl), or $NH_4Cl$ gas to ($H_2+H_2O$) gas which is provided for the roasting and reduction step 5.

(6) Providing chlorine gas ($Cl_2$), hydrogen chloride gas (HCl), or $NH_4Cl$ gas for the roasting and reduction step 5.

(7) Adding $CCl_4$ or $C_2H_3Cl_3$ to the $UO_2$ powder, forwarded from the roasting and reduction step 5 to the grinding and granulation step 6, or to the selected $UO_2$ powder, forwarded from the grinding and granulation step 6 to the forming step 7.

(8) Adding $CCl_4$ or $C_2H_3Cl_3$, which serves as a grinding medium or lubricant in the grinding and granulation step 6.

(9) Adding $CCl_4$ or $C_2H_3Cl_3$, which serves as a lubricant in the forming step 7.

(10) Providing chlorine gas ($Cl_2$), hydrogen chloride gas (HCl), $CCl_4$ or $C_2H_3Cl_3$ for the sintering step 8.

(b) Process for producing a $UO_2$ pellet by the AUC method

The process for producing the $UO_2$ pellet based on the AUC method, comprising the steps of producing $UO_2$ powder from $UF_6$, will now be described in detail with reference to FIG. 2.

$UF_6$, an $(NH_4)_2(CO_3)$ aqueous solution, $NH_3$, and $CO_2$ are first supplied for a hydrolysis and precipitation step 11, in which ammonium uranyl carbonate (AUC) slurry is produced. That is, $UF_6$, $NH_3$, and $CO_2$ are simultaneously supplied to a tank containing an $(NH_4)_2(CO_3)$ aqueous solution, in which hydrolysis and precipitation reactions are carried out.

The AUC slurry is then filtered and washed in a filtration and washing step 12, thereby producing an AUC cake. More specifically, the resulting AUC slurry is filtered by a rotary filter, and is washed by methanol for the purpose of dehydration and desiccation.

The AUC cake is supplied to a roasting and reduction step 13. In the roasting and reduction step 13, the AUC is pyrolyzed and reduced, under an atmosphere of hydrogen ($H_2$) and steam ($H_2O$), thereby producing a $UO_2$ powder. Since the resulting $UO_2$ powder, as it is, is highly activated and might re-oxidize, it is forwarded to a stabilizing treatment step 14. In the stabilizing treatment step 14, nitrogen ($N_2$) gas, which includes a small amount of oxygen ($O_2$) gas, is added to the $UO_2$ powder, causing partial re-oxidation, thereby stabilizing and producing $UO_2$ powder, which includes $UO_2$ powder having a specific surface area of 5–50 $m^2/g$.

The $UO_2$ powder with a specific surface of 5–50 $m^2/g$, selected from the $UO_2$ powder resulting from the stabilizing treatment step 14, is sent to a forming step 15, in which the $UO_2$ powder is compressed, thereby forming a compact thereof. The resulting $UO_2$ compact produced by the forming step 15 is sintered in a sintering step 16, thereby forming a $UO_2$ pellet.

In one or more of the foregoing $UO_2$ powder producing steps 11–14, compact forming step 15, or compact sintering step 16, chlorine or a chlorine compound is added, so that the chlorine content in the $UO_2$ pellet amounts to 3–25 ppm.

Alternatively, in one or more of the foregoing $UO_2$ powder producing steps 11–14, compact forming step 15, or compact sintering step 16, bromine or a bromine compound is added, so that the bromine content in the $UO_2$ pellet amounts to 6–50 ppm.

Still alternatively, in one or more of the foregoing $UO_2$ powder producing steps 11–14, compact forming step 15, or compact sintering step 16, chlorine or a chlorine compound and bromine or a bromine compound are added, so that the contents of chlorine and bromine in the $UO_2$ pellet satisfy the following formula:

(Chlorine content/x)+(Bromine content/y)=1 (1) wherein x is any number ranging from 3 to 25, and y is any number ranging from 6 to 50.

The method of addition will now be illustrated with reference to FIG. 2 as follows:

(1) Adding $UCl_4$ to a raw material $UF_6$, while adding $NH_4Cl$ to an $(NH_4)_2(CO_3)$ aqueous solution.

(2) Adding $NH_4Cl$ to the obtained AUC slurry.

(3) Adding chlorine gas ($Cl_2$), hydrogen chloride gas (HCl), or $NH_4Cl$ gas to ($H_2+H_2O$) gas which is provided for the roasting and reduction step 13.

(4) Providing chlorine gas ($Cl_2$), hydrogen chloride gas (HCl), or $NH_4Cl$ for the roasting and reduction step 13.

(5) Adding $CCl_4$ or $C_2H_3Cl_3$ to $UO_2$ powder, forwarded from the roasting and reduction step 13 to the stabilizing treatment step 14, or treated $UO_2$ powder, forwarded from the stabilizing treatment step 14 to the forming step 15.

(6) Adding $CCl_4$ or $C_2H_3Cl_3$ to serve as lubricant in the forming step 15.

(10) Providing chlorine gas ($Cl_2$), hydrogen chloride gas (HCl), $CCl_4$ or $C_2H_3Cl_3$ for the sintering step 16.

As will be apparent, in the case where a volatile chlorine-containing organic compound is used, chlorine is released and discharged. As a substitute, $C_2H_3Cl_3$ can be used and a similar effect can be obtained.

In addition to the processes for producing $UO_2$ powder from $UF_6$ as described in the foregoing FIG. 1 and FIG. 2, the $UO_2$ pellet according to the present invention can be obtained by producing powder from uranyl nitrate and the like.

DETAILED DESCRIPTION OF THE PREFERRED EMBODIMENT

Figure 1:
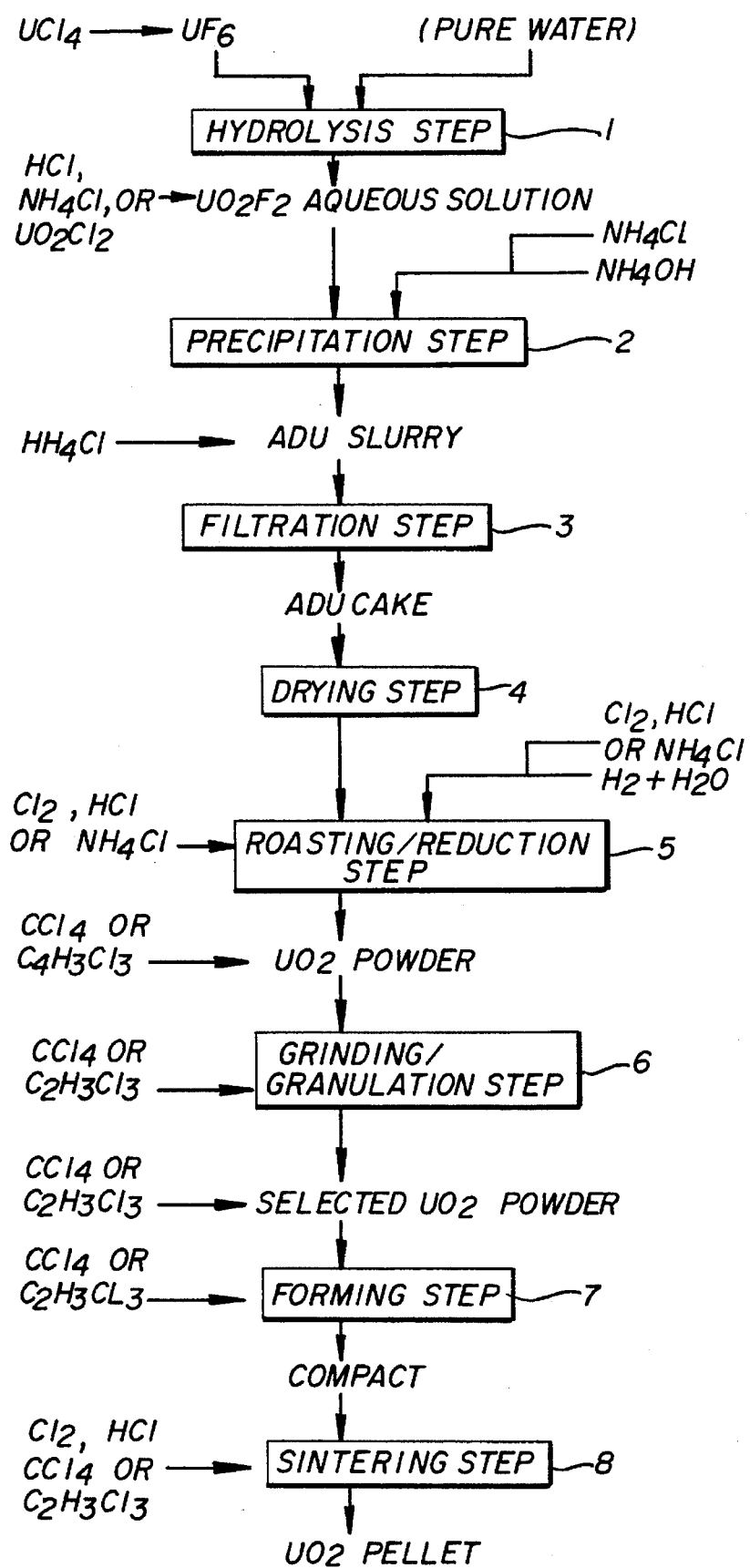
FIG. 1 is a flow chart of steps illustrating a process for producing a $UO_2$ pellet according to the ADU method of the present invention.
Figure 2:
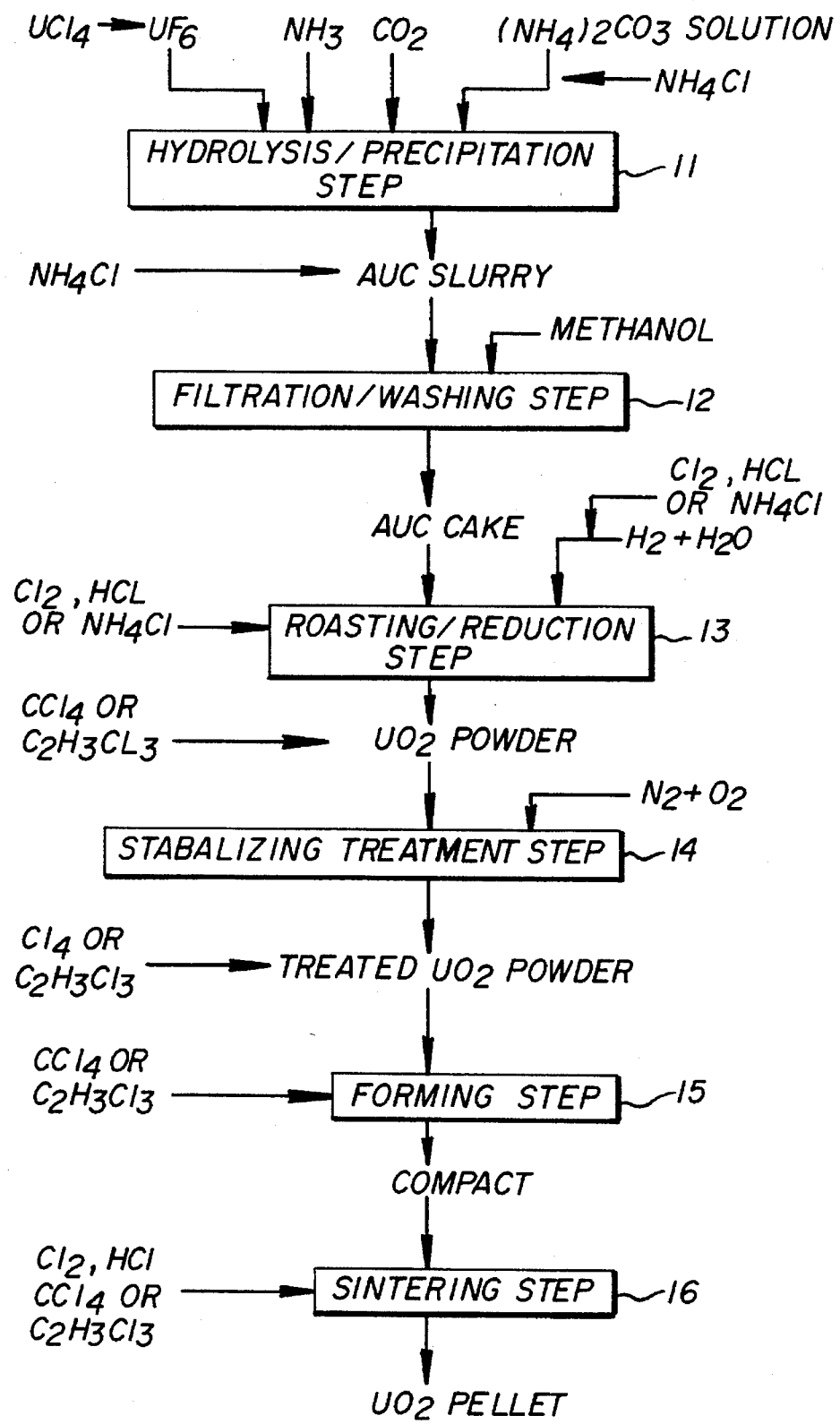
FIG. 2 is a flow chart of steps illustrating a process for producing a $UO_2$ pellet according to the AUC method of the present invention.

The present invention is illustrated in more detail by reference to the following examples, to which the invention is not limited.

EXAMPLE 1

$UO_2$ powder was produced from $UF_6$ according to the ADU method. First, $UF_6$ was reacted with pure water, thereby producing an $UO_2F_2$ aqueous solution. Hydrochloric acid (HCl), in a proportion of 11 mole % to uranium, was added to the $UO_2F_2$ aqueous solution. Then, $NH_4OH$ was added to the $UO_2F_2$ aqueous solution, to which hydrochloric acid had been added, and the reactants were allowed to react with each other, thereby producing an ADU slurry. An ADU cake was produced by filtering the ADU slurry.

After being dried, the resulting ADU cake was roasted and reduced, under an atmosphere of hydrogen ($H_2$) and steam ($H_2O$), at a temperature of from 500° C. to 680° C. for 3.5 hours. Since the resulting $UO_2$ powder by itself did not have sufficient formability and sinterability, it was subjected to a grinding and granulation treatment, thereby producing $UO_2$ powder which had a specific surface area of 7.9 $m^2$/g based on the BET measurement method and contained 10.9 ppm of chlorine.

The $UO_2$ powder was formed under a forming pressure of 3 t/$cm^2$, thereby producing a compact thereof. Then the compact was sintered under an atmosphere of hydrogen at a temperature of 1750° C. for 4 hours, thereby producing a $UO_2$ pellet containing 4.5 ppm chlorine. The crystal grain diameter of the $UO_2$ pellet turned out to be 74.6 μm, as measured by the cross method according to ASTM-112.

EXAMPLE 2

$UO_2$ powder was produced in the same manner as in EXAMPLE 1, except that $NH_4Cl$, in a proportion of 30 mole % to uranium, was added to the $UO_2F_2$ aqueous solution, thereby producing $UO_2$ powder which had a specific surface area of 7.5 $m^2$/g. The chlorine content of the $UO_2$ powder was 48 ppm. In the same manner as in EXAMPLE 1, a $UO_2$ pellet was produced from this $UO_2$ powder. The chlorine content of this resulting pellet was 15.4 ppm, and the crystal grain diameter thereof was 56.8 μm.

EXAMPLE 3

$U_3O_8$ was reacted with nitric acid, thereby producing an uranyl nitrate aqueous solution. Hydrochloric acid (HCl), in a proportion of 11 mole % to uranium, was added to the uranyl nitrate aqueous solution. $NH_4OH$ was added to the uranyl nitrate aqueous solution, to which hydrochloric acid had been added, and the reactants were allowed to react with each other, thereby producing an ADU slurry. An ADU cake was produced by filtering the ADU slurry.

After being dried, the resulting ADU cake was roasted and reduced under an atmosphere of hydrogen ($H_2$) and steam ($H_2O$) at a temperature of from 500° C. to 680° C. for 3.5 hours, thereby producing $UO_2$ powder. The specific surface area of the $UO_2$ powder was 23.8 $m^2$/g based on the BET measurement method and the chlorine content was 22 ppm. The chlorine content of the sintered pellet was 13 ppm, and the crystal grain diameter thereof was 42.5 μm.

EXAMPLE 4

$UF_6$ was reacted with pure water, thereby producing an $UO_2F_2$ aqueous solution. $NH_4OH$ was added to the $UO_2F_2$ aqueous solution, thereby producing an ADU slurry. An ADU cake was produced by filtering the ADU slurry.

After being dried, the resulting ADU cake was roasted and reduced under an atmosphere of hydrogen ($H_2$) and steam ($H_2O$) at a temperature of from 500° C. to 680° C. for 3.5 hours, thereby producing $UO_2$ powder. Since the resulting $UO_2$ powder by itself was not sufficient in formability and sinterability, it was subjected to a grinding and granulation treatment, thereby producing $UO_2$ powder which had a specific surface area of 8.8 $m^2$/g based on the BET measurement method. The chlorine content of the $UO_2$ powder was under the limit of detection. A $C_2H_3Cl_3$ aqueous solution was added to the $UO_2$ powder, at a ratio of 0.1 ml of $C_2H_3Cl_3$ to 1 kg of the $UO_2$ powder, and the mixture was mixed by stirring, thereby producing $UO_2$ powder in which the chlorine content was 47 ppm after the pellet was dried.

The chlorine content of the sintered pellet, after forming and sintering, was 4.1 ppm, and the crystal grain diameter thereof was 44.5 μm.

EXAMPLE 5

$UO_2$ powder was produced in the same manner as described in EXAMPLE 4, the specific surface thereof being 13.6 $m^2$/g. The concentration of chlorine of the $UO_2$ powder was under the limit of detection.

After a lubricant, containing $CCl_4$, was added to the $UO_2$ powder and mixed with each other for 10 minutes, the mixture thereof was formed, under a forming pressure of 3 t/cm$^2$, into a compact, which in turn was sintered under an atmosphere of hydrogen at a temperature of 1750° C. for 4 hours, thereby producing a $UO_2$ pellet in which the chlorine content was 4.2 ppm. The crystal grain diameter of the $UO_2$ pellet turned out to be 38.2 μm.

EXAMPLE 6

In the same manner as in EXAMPLE 1, except for the addition of HBr (hydrobromic acid), in a proportion of 100 mole % to uranium, to the $UO_2F_2$ aqueous solution, $UO_2$ powder was produced which had a specific surface area of 9.1 m$^2$/g. The bromine content of the $UO_2$ powder was 83 ppm. In the same manner as in EXAMPLE 1, a $UO_2$ pellet was produced from this $UO_2$ powder. The bromine content of this resulting pellet was 12.0 ppm, and the crystal grain diameter thereof was 47.7 μm.

EXAMPLE 7

In the same manner as in EXAMPLE 1, except for the addition of HCl (hydrochloric acid) and HBr (hydrobromic acid), in a proportion of 11 mole %, respectively, to uranium, to the $UO_2F_2$ aqueous solution, $UO_2$ powder was produced which had a specific surface area of 10.4 m$^2$/g. The chlorine content of the $UO_2$ powder was 12.2 ppm, while the bromine content was 16 ppm. In the same manner as in EXAMPLE 1, a $UO_2$ pellet was produced from this $UO_2$ powder. The chlorine content of this resulting pellet was 4.6 ppm, while the bromine content was 3.0 ppm, and the crystal grain diameter thereof was 70.3 μm.

EXAMPLE 8

$UF_6$ was reacted with pure water, thereby producing an $UO_2F_2$ aqueous solution. $NH_4OH$ was added to the $UO_2F_2$ aqueous solution, thereby producing an ADU slurry. An ADU cake was produced by filtering the ADU slurry.

After being dried, the resulting ADU cake was roasted and reduced, under an atmosphere of hydrogen ($H_2$) and steam ($H_2O$), at a temperature of from 500° C. to 680° C. for 3.5 hours, thereby producing $UO_2$ powder. The resulting $UO_2$ powder was subjected to a grinding and granulation treatment, thereby producing $UO_2$ powder which had a specific surface area of 8.8 m$^2$/g based on the BET measurement method. A $C_2H_3Cl_3$ aqueous solution was added to the $UO_2$ powder, at a ratio of 0.1 ml of $C_2H_3Cl_3$ to 1 kg of the $UO_2$ powder, and the mixture was mixed by stirring, thereby producing a $UO_2$ powder, in which the chlorine content was 49 ppm after the pellet was dried. In the same manner as in EXAMPLE 1, a $UO_2$ pellet was produced from this $UO_2$ powder. The chlorine content of this resulting pellet was 3.6 ppm, and the crystal grain diameter thereof was 40.8 μm.

EXAMPLE 9

$UF_6$ was reacted with pure water, thereby producing an $UO_2F_2$ aqueous solution. An $(NH_4)_2(CO_3)$ aqueous solution, $NH_3$ and $CO_2$ were added to the $UO_2F_2$ aqueous solution, thereby producing an ammonium uranyl carbonate (AUC) slurry. An AUC cake was produced by filtering the AUC slurry.

After being dried, the resulting AUC cake was roasted and reduced under an atmosphere of hydrogen ($H_2$) and steam ($H_2O$) at a temperature of from 500° C. to 680° C. for 3.5 hours, thereby producing $UO_2$ powder. The resulting $UO_2$ powder was subjected to a grinding and granulation treatment, thereby producing $UO_2$ powder, which had a specific surface area of 6.5 m$^2$/g based on the BET measurement method. A $C_2H_3Cl_3$ aqueous solution was added to the $UO_2$ powder, at a ratio of 0.1 ml of $C_2H_3Cl_3$ to 1 kg of the $UO_2$ powder, and the mixture was mixed by stirring, thereby producing $UO_2$ powder, in which the chlorine content was 48 ppm after the powder was dried. In the same manner as in EXAMPLE 1, a $UO_2$ pellet was produced from this $UO_2$ powder. The content of chlorine of this resulting pellet was 7.2 ppm, and the crystal grain diameter thereof was 37.9 μm.

EXAMPLE 10

$UF_6$ was reacted with pure water, thereby producing an $UO_2F_2$ aqueous solution. $NH_4OH$ was added to the $UO_2F_2$ aqueous solution, thereby producing an ADU slurry. An ADU cake was produced by filtering the ADU slurry.

After being dried, the resulting ADU cake was roasted and reduced under an atmosphere of hydrogen ($H_2$) and steam ($H_2O$) at a temperature of from 500° C. to 680° C. for 3.5 hours, thereby producing $UO_2$ powder. The resulting $UO_2$ powder was subjected to a grinding and granulation treatment, thereby producing $UO_2$ powder which had a specific surface area of 7.5 m$^2$/g based on the BET measurement method. The chlorine content of the $UO_2$ powder was under the limit of detection. After the $UO_2$ powder was formed into a pellet, the pellet was sintered under a sintering atmosphere where 50 ppm of humidified hydrogen, mixed with HCl gas, was used, so that the chlorine content of the sintered pellet was 3.2 ppm, and the crystal grain diameter thereof was 42 μm.

The results of each of EXAMPLES 1–10 are shown in the following Table 1. In Table 1, column (1) shows the specific surface area of the selected $UO_2$ powder, column (2) shows the chlorine or bromine content of the selected $UO_2$ powder, column (3) shows the chlorine or bromine content of the $UO_2$ pellet, and column (4) shows the crystal grain diameters of the $UO_2$ pellet. Numbers marked with (*) in column (2) indicate the limit of detection for analysis.

TABLE I

| Example | Method | Add. El. | Addition Step | (1) m$^2$/g | (2) ppm | (3) ppm | (4) μm |
|---|---|---|---|---|---|---|---|
| Ex. 1 | ADU | Cl | HCl to $UO_2F_2$ sln. | 7.9 | 10.9 | 4.5 | 74.6 |
| Ex. 2 | ADU | Cl | $NH_4Cl$ to $UO_2F_2$ sln. | 7.5 | 48.0 | 15.4 | 56.8 |
| Ex. 3 | ADU | Cl | $UO_2Cl_2$ to $UO_2F_2$ sln. | 23.8 | 22.0 | 13.0 | 42.5 |
| Ex. 4 | ADU | Cl | $C_2H_3Cl_3$ to $UO_2$ powder | 8.8 | 47.0 | 4.1 | 44.5 |
| Ex. 5 | ADU | Cl | $CCl_4$ during forming | 13.6 | <1* | 4.2 | 38.2 |
| Ex. 6 | ADU | Br | HBr to $UO_2F_2$ sln. | 9.1 | 83.0 | 12.0 | 47.7 |
| Ex. 7 | ADU | Cl Br | HCl + HBr to $UO_2F_2$ sln. | 10.4 | 12.2 16.0 | 4.6 3.0 | 70.3 |
| Ex. 8 | ADU | Cl | $CCl_4$ to $UO_2$ powder | 8.8 | 49.0 | 3.6 | 40.8 |
| Ex. 9 | AUC | Cl | $C_2H_3Cl_3$ to $UO_2$ powder | 6.5 | 48.0 | 7.2 | 37.9 |
| Ex. 10 | ADU | Cl | HCl during sintering | 7.5 | <1* | 3.2 | 42.0 |

As will be seen from the foregoing, the present invention provides a process for producing a $UO_2$ pellet including a step of producing $UO_2$ powder in accordance with the ADU method or the AUC method, wherein said process comprises the steps of forming a $UO_2$ compact from an $UO_2$ powder used as a raw material which has a specific surface area of 5–50 $m^2/g$, and adding a specific amount of at least one of chlorine, a chlorine compound, bromine or a bromine compound, thereby enabling the production of a sintered $UO_2$ pellet having a large crystal grain with a high reliability.

What is claimed is:

1. A $UO_2$ pellet containing 3–25 ppm of chlorine.
2. A $UO_2$ pellet containing 6–50 ppm of bromine.
3. A $UO_2$ pellet containing a total of 3–50 ppm of chlorine and bromine, wherein the chlorine and bromine contents satisfy the following formula (1):

(Chlorine content/x)+(Bromine content/y)=1 (1) wherein x is any number ranging from 3 to 25, and y is any number ranging from 6 to 50.

4. A process for producing a $UO_2$ pellet, comprising the steps of:

producing $UO_2$ powder in accordance with the ADU method or the AUC method;

forming a compact of said $UO_2$ powder; and sintering said compact, wherein $UO_2$ powder having a specific surface area of 5–50 $m^2/g$ is used as a raw material in said compact forming step, and the amount of chlorine or chlorine compound added, in one or more of said $UO_2$ powder producing step, said compact forming step, or said compact sintering step, is such that the chlorine content in the $UO_2$ pellet amounts to 3–25 ppm.

5. A process for producing a $UO_2$ pellet as recited in claim 4, wherein said amount of chlorine or chlorine compound added is equivalent to 10–50 ppm of chlorine, whereby the chlorine content in the $UO_2$ pellet is 3–25 ppm.

6. A process for producing a $UO_2$ pellet, comprising the steps of:

producing $UO_2$ powder in accordance with the ADU method or the AUC method;

forming a compact of said $UO_2$ powder; and sintering said compact, wherein $UO_2$ powder having a specific surface of 5–50 $m^2/g$ is used as a raw material in said compact forming step, and the amount of bromine or bromine compound added, in one or more of said $UO_2$ powder producing step, said compact forming step, or said compact sintering step, is such that the bromine content in the $UO_2$ pellet amounts to 6–50 ppm.

7. A process for producing a $UO_2$ pellet as recited in claim 4, wherein said amount of bromine or bromine compound added is equivalent to 20–100 ppm of bromine, whereby the bromine content in the $UO_2$ pellet is 6–50 ppm.

8. A process for producing a $UO_2$ pellet, comprising the steps of:

producing $UO_2$ powder in accordance with the ADU method or the AUC method;

forming a compact of said $UO_2$ powder; and sintering said compact, wherein $UO_2$ powder having a specific surface area of 5–50 $m^2/g$ is used as a raw material in said compact forming step, and the amount of chlorine or chlorine compound and bromine or bromine compound added, in one or more of said $UO_2$ powder producing step, said compact forming step, or said compact sintering step, is such that the chlorine and bromine contents satisfy the following formula (1):

(Chlorine content/x)+(Bromine content/y)=1 (1) wherein x is any number ranging from 3 to 25, and y is any number ranging from 6 to 50.

9. A process for producing a $UO_2$ pellet as recited in claim 8, wherein said amount of chlorine or chlorine compound and bromine or bromine compound added is equivalent to 10–100 ppm in total amount of chlorine and bromine, and wherein the chlorine and bromine contents in the $UO_2$ pellet satisfy said formula (1), and the following formula (2) is also satisfied:

(Amount of added chlorine or chlorine compound/x')+(Amount of added bromine or bromine compound/y')=1 (2) wherein x' is any number ranging from 10 to 50, and y' is any number ranging from 20 to 100.

* * * * *